(12) United States Patent
Chen et al.

(10) Patent No.: US 11,445,273 B1
(45) Date of Patent: Sep. 13, 2022

(54) SYSTEM AND METHOD FOR CREATING A VIDEO SUMMARY BASED ON VIDEO RELEVANCY

(71) Applicant: CLIPr Co., Kirkland, WA (US)

(72) Inventors: Humphrey Chen, Norwood, NJ (US); Cindy Chin, New York, NY (US); Aaron Sloman, Costa Mesa, CA (US)

(73) Assignee: CLIPr Co., Kirkland, WA (US)

( * ) Notice: Subject to any disclaimer, the term of this patent is extended or adjusted under 35 U.S.C. 154(b) by 0 days.

(21) Appl. No.: 17/317,625

(22) Filed: May 11, 2021

(51) Int. Cl.
| | | |
|---|---|---|
| *H04N 21/85* | (2011.01) | |
| *H04N 21/8549* | (2011.01) | |
| *H04N 21/258* | (2011.01) | |
| *H04N 21/472* | (2011.01) | |
| *H04N 21/235* | (2011.01) | |

(52) U.S. Cl.
CPC ..... *H04N 21/8549* (2013.01); *H04N 21/2353* (2013.01); *H04N 21/258* (2013.01); *H04N 21/47205* (2013.01)

(58) Field of Classification Search
CPC ........... H04N 21/8549; H04N 21/2353; H04N 21/258; H04N 21/47205
See application file for complete search history.

(56) References Cited

U.S. PATENT DOCUMENTS

| | | |
|---|---|---|
| 5,835,667 A | 11/1998 | Wactlar et al. |
| 2002/0093591 A1 | 7/2002 | Yihong et al. |
| 2014/0328570 A1 | 11/2014 | Hui et al. |
| 2018/0176661 A1 | 6/2018 | Varndell et al. |
| 2020/0372066 A1 | 11/2020 | Piyush et al. |
| 2021/0383127 A1* | 12/2021 | Kikin-Gil .............. G06V 20/41 |

FOREIGN PATENT DOCUMENTS

DE 102006027720 12/2007

OTHER PUBLICATIONS

International Search Report and Written Opinion of the International Searching Authority for PCT/US2021/032166 dated Feb. 8, 2022, 13 pages.

* cited by examiner

*Primary Examiner* — Girumsew Wendmagegn
(74) *Attorney, Agent, or Firm* — Lowenstein Sandler LLP

(57) ABSTRACT

System and method for creating a video summary are disclosed. The system includes a registration module configured to register multiple users on a platform, a video input module configured to receive videos, a transcript input module configured to receive multimedia transcripts, a video analysis module configured to analyse the videos, a transcript analysis module configured to analyse the multimedia transcript, a video summary module configured to create the video summary of the videos integrating with the multimedia transcripts, a video storage module configured to store the video summary, a video review module configured to enable the users to create a review, a video editing module configured to edit the video summary to create a new video summary.

12 Claims, 5 Drawing Sheets

SYSTEM AND METHOD FOR CREATING A VIDEO SUMMARY BASED ON VIDEO RELEVANCY

FIELD OF INVENTION

Embodiments of a present disclosure relate to generate a video summary, and more particularly, to a system and method for creating a video summary based on relevancy.

BACKGROUND

Video summary or a video synopsis is a presentation of events that enables the review of hours of video footage in a pre-defined amount of time. More specifically, video summary can be described as a brief presentation of contents by merging multiple images or videos. In a conventional approach, a user may create the video summary by manually editing the multiple videos and syncing multiple edited video frames to generate the video summary. However, the conventional approach is time consuming as it is done manually and also are prone to miss out the most relevant frames due to human errors. Due to these limitations, the conventional approach is less reliable and less efficient.

In comparison to the conventional approach, a newer approach is used to create the video summary automatically by a computing device. However, the newer approach does not allow an integration of the videos with audio enabled transcripts which. Such newer approach enables video collaboration independently and text collaboration independently. In addition, the newer approach does not enable the user to review and edit the video summary if he/she wishes to alter the moments, by adding time coded comments or an actionable assigned task. Also, such approaches do not allow multiple users to interact and decide on the comments or tasks provided to modify the video summary. Such limitations make the newer approach limited to only a specific task and thereby less reliable and less efficient, which does not satisfy the requirements and needs of the user.

Hence, there is a need for an improved system and method for creating a video summary using relevancy to address the aforementioned issues.

BRIEF DESCRIPTION

In accordance with one embodiment of the disclosure, a system to create a video summary is disclosed. The system includes one or more processors. The system also includes a registration module configured to register a plurality of users on a platform. The system also includes a video input module configured to receive one or more videos associated to the plurality of users, from one or more sources. The system also includes a transcript input module configured to receive at least one multimedia transcript associated to the one or more videos, from the one or more sources. The system also includes a video analysis module configured to analyse the one or more videos based on one or more features to determine a relevancy between each of the one or more videos using an image processing technique. The system also includes a transcript analysis module analyse the at least one multimedia transcript based on the one or more features to determine a relevancy between each of the at least one multimedia transcript using one of an image processing technique, a natural language processing technique, or a combination thereof. The system also includes a video summary module configured to create the video summary upon integrating the one or more videos and the of the at least one multimedia transcript based on the analysis done by the video analysis module and the transcript analysis module. The system also includes a video storage module configured to store the video summary in a video library database. The system also includes a video review module configured to enable at least one of the plurality of users to create a review associated with one or more parameters from the video summary upon reviewing the created video summary from the video library database. The system also includes a video editing module configured to configured to edit the video summary to create a new video summary and integrating at least one new multimedia transcript with the video summary, using a building block model based on one or more analysed videos using one of an artificial intelligence technique or a machine learning technique, or a combination thereof, based on the review created by the at least one of the plurality of users.

In accordance with another embodiment of the disclosure, a method for creating a video summary is disclosed. The method includes registering a plurality of users on a platform. The method also includes receiving one or more videos associated to the plurality of videos, from one or more sources. The method also includes receiving at least one multimedia transcript associated to the one or more videos, from one or more sources. The method also includes analysing the one or more videos based on one or more features for determining a relevancy between each of the one or more videos using an image processing technique. The method also includes analysing the at least one multimedia transcript based on the one or more features to determine a relevancy between each of the at least one multimedia transcript using an image processing technique. The method also includes the video summary upon integrating the one or more videos and the of the at least one multimedia transcript based on the analysis. The method also includes storing the video summary in a video library database. The method also includes enabling at least one of the plurality of users for creating a review associated with one or more parameters from the video summary upon reviewing the created video summary from the video library database. The method also includes editing the video summary to create a new video summary and integrating at least one new multimedia transcript with the video summary, using a building block model based on one or more analysed videos using one of an artificial intelligence technique or a machine learning technique, or a combination thereof, based on the review created by the at least one of the plurality of users.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and method for creating a video summary. As used herein, the term 'video summary' may be defined as a presentation of events that enables the review of hours of video footage in a pre-defined amount of time.

Figure 1:
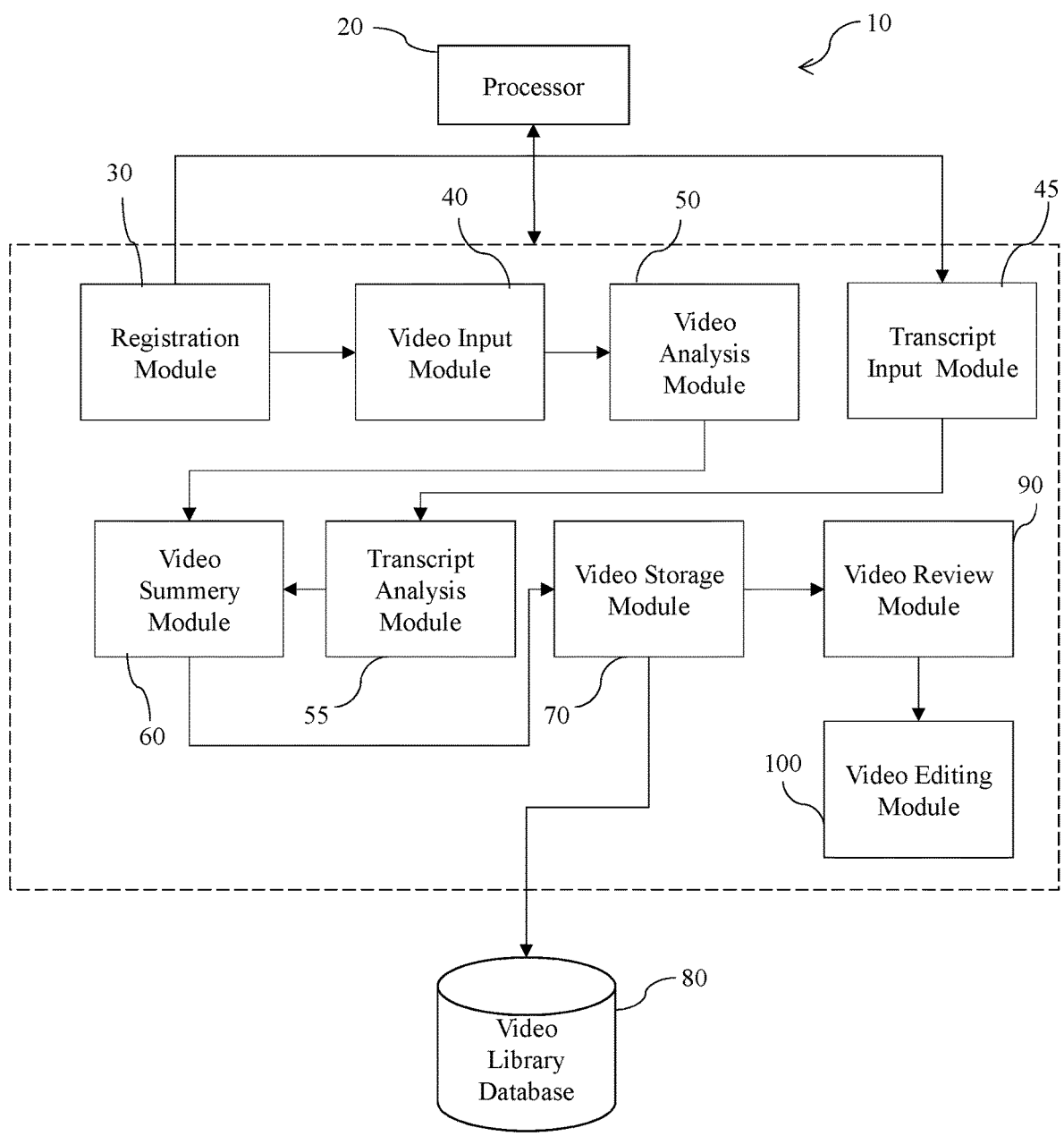
FIG. 1 is a block diagram representation of a system to create video summary in accordance with an embodiment of the present disclosure.

FIG. 1 is a block diagram representation of a system 10 to create video summary in accordance with an embodiment of the present disclosure. The system 10 includes one or more processors 20. The system 10 also includes multiple modules which are operable by the one or more processors 20. The system 10 also includes a registration module 30. The registration module 30 is configured to register a plurality of users on a platform. In one embodiment, the plurality of user may register on the platform upon providing a plurality of user details such as name, age, occupation, employer, contact details/s or the like. In one exemplary embodiment, the platform may be a one of a centralized platform or a decentralized platform. In such embodiment, the decentralized platform may be one of an umbrella platform, a private platform or a public platform. Further, based on the type of platform, the corresponding plurality of users may have access for the same.

The system 10 also includes a video input module 40 configured to receive one or more videos associated to the plurality of users, from one or more sources. In one embodiment, the one or more videos may be representative of an event which may be associated to the corresponding plurality of users. In one exemplary embodiment, the one or more sources may include at least one of an internal source, an external source or a combination thereof. Here, in one embodiment, the internal source may include a storage unit within the platform. In another embodiment, the internal storage may be a storage unit within a user device through which the corresponding plurality of users may be accessing the platform. In such embodiment, the user device may be a computing device such as a laptop, a tablet, a mobile phone, or the like. Further, in one exemplary embodiment, the one or more external sources may include a storage unit which may not be synced with the platform or with the user device. In such embodiment, the one or more videos may be transmitted to the video input module 40 via a communication medium.

In some embodiment, the one or more videos may be transferred or transmitted to the video input module 40 or may retrieve the one or more videos automatically based on certain pre-defined set of instructions. In one embodiment, the pre-defined set of instructions may include at least one of a date, a day, a place, a type of event, a specific person, a specific group of people, keywords, highlights or the like. In such embodiments, the video input module 40 may use a crawler to crawl the storage unit in order to access the one or more videos upon applying the pre-defined set of instructions on the storage unit. The pre-defined set of instructions may be set by an authorized user or by the corresponding one or more users.

Furthermore, the system 10 includes a multimedia transcript input module 45. The multimedia transcript input module 45 is configured to receive at least one multimedia transcript associated to the one or more videos, from the one or more sources. In one embodiment, the at least one multimedia transcript may include at least one of text transcripts, enriched metadata, voice/audio transcripts, or a combination thereof, wherein the at least one multimedia transcript is associated to the one or more videos. In one specific embodiment, the text transcripts may be a voice-based text transcripts.

Furthermore, the system 10 includes a video analysis module 50 configured to analyse the one or more videos based on one or more features to determine a relevancy between each of the one or more videos using an image processing technique. In one embodiment, the one or more features may include at least one of time at which the one or more videos were captured, place in which the one or more videos were captured, event in which the one or more videos were captured, at least one of the plurality of users who have been captured in the one or more videos, content of the one or more videos or the like. As used herein, the term "image processing technique" may be referred as a method or a technique to perform some operations on an image or a video, in order to extract some useful information from the one or more videos. Also, the term 'relevancy' is defined as a quality or state of being closely connected or appropriate. Further, the video analysis module 50 on applying the image processing technique, distinguishes the one or more videos and may categorize the same based on the one or more features. In one exemplary embodiment, the one or more features may be defined by one of an authorized person, at least one of the plurality of users or a combination thereof.

The system 10 also includes a transcript analysis module 55. The transcript analysis module 55 is configured to analyse the at least one multimedia transcript based on the one or more features to determine a relevancy between each of the at least one multimedia transcript. The analysis of the at least one multimedia transcript is done using one of an image processing technique, a natural language processing technique, a machine learning technique, or a combination thereof. More specifically, the relevance between each of the at least one multimedia transcript is analysed by the transcript analysis module 55. In one exemplary embodiment, one or more features associated to the corresponding at least one multimedia transcript may include at least one multimedia transcript based on at least one of time at which the one or more transcripts were created, event associated to the at least one multimedia transcript, at least one of the plurality of users associated to the corresponding at least one multimedia transcripts, content of the one or more transcripts or the like.

The system 10 also includes a video summary module 60 configured to create the video summary of the one or more videos. The analysed relevancy of the transcript is also matched with relevance analysed for the corresponding one or more videos, based on which the video summary is created. In one exemplary embodiment, the video summary may be created using a building block model based on one or more analysed videos and at least one analysed multimedia transcripts using one of an artificial intelligence technique or a machine learning technique, or a combination thereof. As used herein, the term "artificial intelligence (AI)" is defined as an intelligence demonstrated by machines to perform or mimic human intelligence and human behavior. Also, the term "Machine learning (ML)" is defined as a study of computer algorithms that improve automatically through experience upon leaning using a built model which is based on a sample set of data. In one exemplary embodiment, the AI technique may include a natural language processing technique. In one embodiment, the ML technique may include one of a supervised technique. In operation, the video summary module 60 creates a video summary based on determined relevancy between the one or more videos and the multimedia transcripts for a pre-defined interval of time. Here, the one or more videos may be divided into multiple video frames and may be matched with the corresponding transcripts to integrate them for creating the video summary.

The system 10 further includes a video storage module 70 configured to store the video summary in a video library database 80. In operation, as the video summary is created by the video summary module 60, the same is stored in the video library database 80 by the video storage module 70 upon receiving an instruction from the one or more processors 20.

Furthermore, the system 10 includes a video review module 90 configured to enable at least one of the plurality of users to create a review associated with one or more parameters from the video summary upon reviewing the created video summary from the video library database 80. At least one of the plurality of users can review the video summary upon enabling at least one of the plurality of users to tag one or more of the plurality of users to view the video summary. The review is not required, but if completed the suggestions or changes in the review process are fed back into the machine learning processes in the Transcript Analysis Module 55 to improve accuracy and reduce the review time on subsequent jobs with similar content.

More specifically, as the video summary gets stored in the video library database 80, the plurality of users can view the video summary via the platform. Any one of the plurality of users can also tag one or more users from the plurality of user or may tag one or more users who may be among a new plurality of user, wherein the new plurality of users may or may not be registers on the platform. Subsequently, one or more users may identify time coded comments and actionable assigned tasks at specific moments to the millisecond or over a duration of the video summary, wherein the specific moment may be associated with the corresponding one or more videos. On identifying the same, the one or more users may create a summary which is associated to the one or more parameters. In one embodiment, the one or more parameters may include at least one of coded comments, actionable assigned tasks, one or more moments, keywords, highlights, or a combination thereof. Further, the one or more parameters may be represented as at least one new multimedia transcript, and the same may be transmitted to the platform. In one exemplary embodiment, the at least one new multimedia transcript may include at least one of text transcripts, enriched metadata, voice/ audio transcripts, or a combination thereof. In one exemplary embodiment, the one or more users may generate and transmit an approval for the created video summary.

The system 10 further includes a video editing module 90 configured to edit the video summary to create a new video summary and integrating at least one multimedia transcript with the new video summary. The new video summary is created using the building block model based on one or more analysed videos on implementing one of the artificial intelligence technique, the machine learning technique, or a combination thereof, based on the review created by the at least one of the plurality of users. In one embodiment, the video editing module 90 may create the new video summary by using a new building block model which was enhanced from the building block model upon identifying the relevancy of the shared at least one new multimedia transcripts and enabling the building block model to learn from the same. Further, the new video summary is an amalgamate of the video summary which was initially created and the at least one new multimedia transcripts shared by the one or more users on reviewing the initially created video summary.

Furthermore, the video storage module 70 may be further configured to store the new video summary in the video library database 80.

In one exemplary embodiment, the system 10 may further include a video interaction module which may be configured to interact with the corresponding one or more users registered on the platform. Here, the interaction may be associated to one of the coded comments, the actionable assigned tasks, or a combination thereof to create the new video summary. More specifically, the one or more users may decide among themselves whether a new video summary need to be created or not by interacting with each other on the platform via the user device.

In another exemplary embodiment, the system 10 may further include a notification module which may be configured to generate a notification representative of the review created by the at least one of the plurality of users based on one or more policies. In such embodiment, the one or more policies may include at least one collaboration of the plurality of the user, wherein the one or more policies are categorized by the one or more authorized users. In one embodiment, the one or more authorized users may include the plurality of users, one or more reviewers, or a combination thereof, who may have the authority to modify the video summary. In one specific embodiment, the one or more policies may be multiple categorizations of the users which may also include a plurality of rules representative of the authority to modify the draft.

In yet another specific embodiment, the system 10 may further include a video sharing module which may be configured to share the video summary among the plurality of users upon receiving an instruction from at least one of the plurality of authorized users. The video summary may be shared internally among the plurality of users or externally among multiple users and reviewers. More specifically, the video summary may be shared privately among the users or publicly with the users. In such embodiment, the video interaction module may further to configured to enable the multiple users and the reviewers to interact on the platform by providing one or more comments or one or more tasks to facilitate the discussion associated to the video summary. Further, these comments or tasks may be persisted or be closed by the authorized users to signify the completion of workflow of the video summary which is a collaboration of the one or more videos and the at least one multimedia transcripts.

Figure 2:
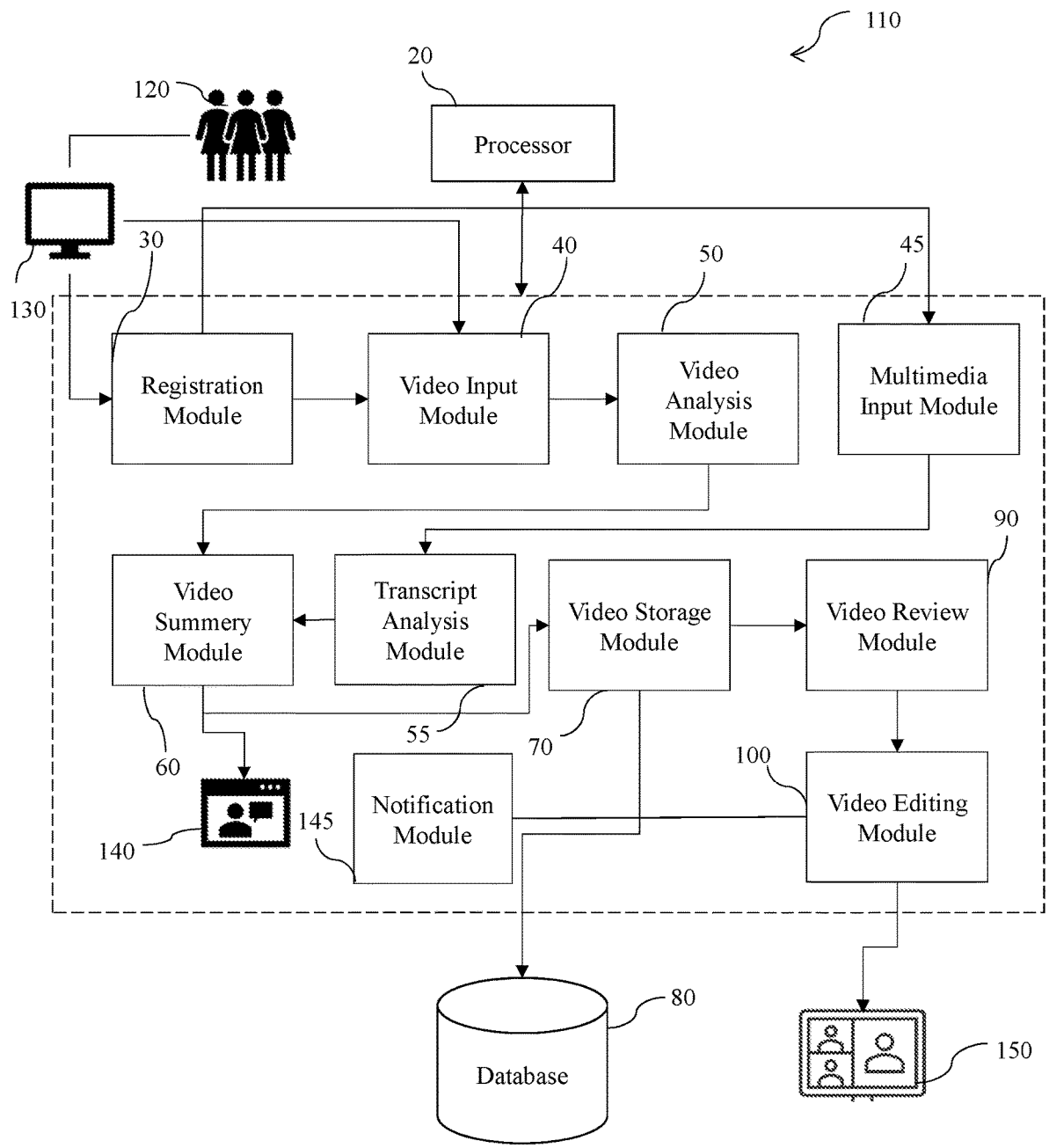
FIG. 2 is a block diagram representation of an exemplary embodiment of the system to create video summary for a conference of FIG. 1 in accordance with an embodiment of the present disclosure.

FIG. 2 is a block diagram representation of an exemplary embodiment of the system 110 to create video summary for a conference of FIG. 1 in accordance with an embodiment of the present disclosure. Multiple users 120 who have attended the conference and wish to retrieve the video summary of the conference (which we assume to be held on a day 'X' dated 'Y') would register onto the platform upon provide multiple user details via a user device 130 through a registration module 30. Further, multiple videos are uploaded to the platform via a video input module 40 through the multiple user 120 who attended the conference and have registered on the platform. Simultaneously, multiple voice-based text transcripts are also transmitted to the platform via a transcript input module 45 by the multiple users.

Further, once the system 110 receives the multiple videos and multiple text transcripts, they are analysed for the relevancy among each other to verify whether the content of the videos and the transcripts belong to the conference which was held on the day X; analysis of the multiple videos and the multiple transcripts are done by a video analysis module 50 and a transcript analysis module 55 respectively. The multiple videos are segregated into multiple video frames to sync with the corresponding multiple transcripts. On identifying a relevancy, a building block model gets generated by building block module. With the generated building block, a video summary 140 which is an integration of the multiple video frames and the multiple voice-based text transcripts gets created by a video summary module 60.

Further, the generated video summary 140 is stored in a video library database 80 by a video storage module 70. The stored video summary 140 is now ready to be displayed on the platform through the video library database 80. The multiple user 120 view the video summary 140 via the user device 130. On review the same, one of the multiple users 120 who is an authorized user, tags the participants and shares the video summary 140 with the participants of the conference who are a sector among the same multiple user 120. Furthermore, the multiple users 120 watches the video frames, the text transcripts and also the audio corresponding to the text transcripts. One among the multiple user 120 wishes to add a comment which is time codes at a specific moment in the video summary 140 which the user feels quite important concept of the conference. The user wishes to add the comment at a duration of 'Z' seconds in the video summary 140 and may transmit the time coded comment onto the platform via a video review module 90 through the user device 130. As the user transmits the comment to the platform, the participants and the authorized user who were tagged to the video summary 140 gets a notification with respect to the shared comment. Here, the notification is generated by a notification module 145. The other multiple users 120 tend to provide their opinion with respect to the added comment via a video interaction module. The authorized user allows the comments to be included in the video summary 140. On receiving such a notification, a new video summary 150 is generated by a video editing module 100. The new video summary 150 is stored in the video library database 80 via the storage module 170. The new video summary 150 is further shared with the multiple users for their reference.

It should be noted that, all the above-described modules of FIG. 2 are operable by one or more processors 20. Furthermore, the system 110, the registration module 30, the video input module 40, the video analysis module 50, the transcript input module 45, the transcript analysis module 55, the video summary module 60, the video storage module 70, the video library database 80, the video review module 90, the video editing module 100, the video interaction module, the notification module 145 of FIG. 2 are substantially similar to a system 10, a registration module 30, a video input module 40, a video analysis module 50, a transcript input module 45, a transcript analysis module 55, a video summary module 60, a video storage module 70, a video library database 80, a video review module 90, a video editing module 100, a video interaction module, a notification module of FIG. 1, and all the embodiments described in FIG. 1 applies to corresponding modules of FIG. 2.

Figure 3:
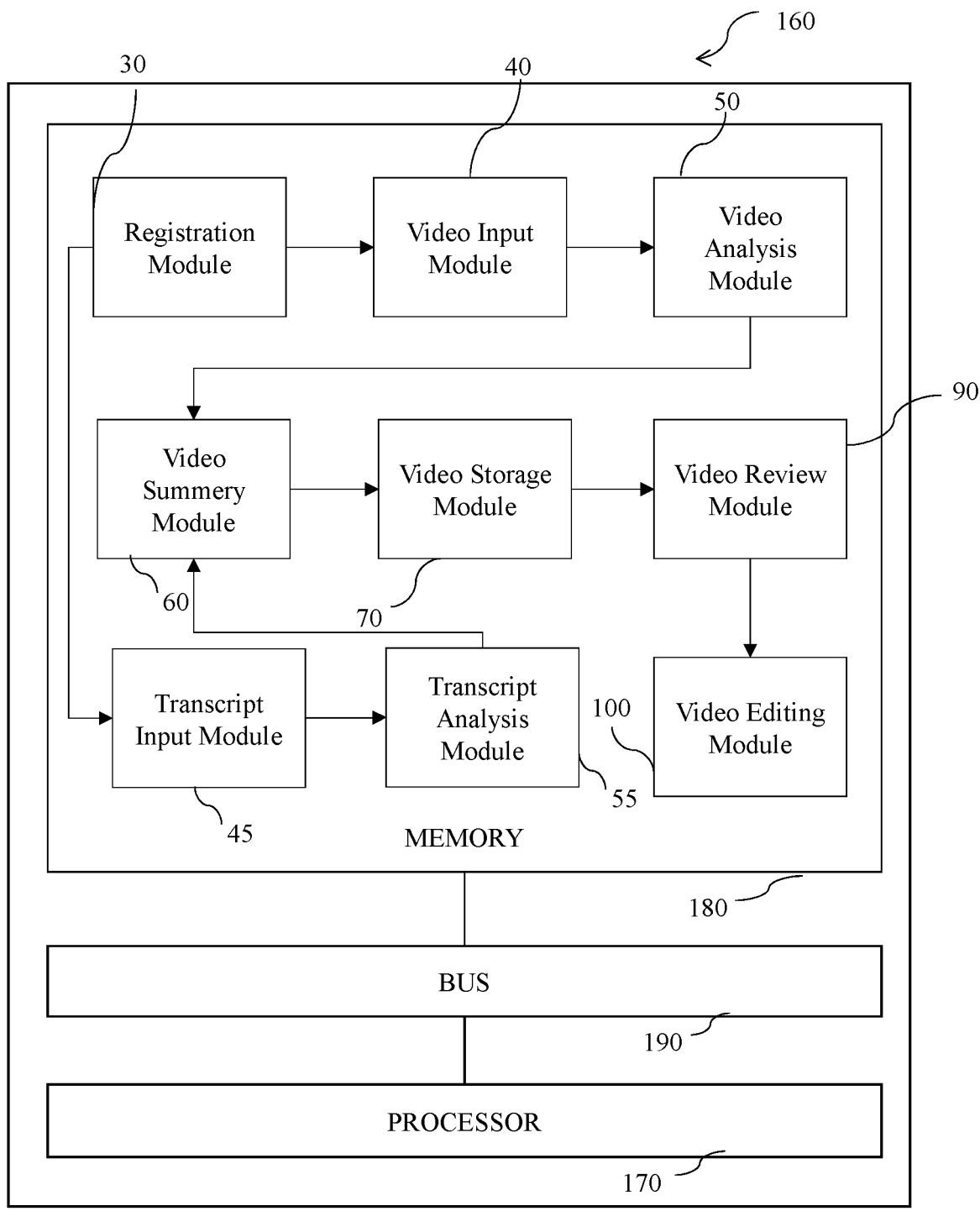
FIG. 3 is a block diagram representation of a processing subsystem located on a local server or on a remote server in accordance with an embodiment of the present disclosure.

FIG. 3 is a block diagram representation of a processing subsystem located on a local server or on a remote server in accordance with an embodiment of the present disclosure. The server 160 includes processor(s) 170, and memory 180 operatively coupled to the bus 190.

The processor(s) 170, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

Figure 4A:
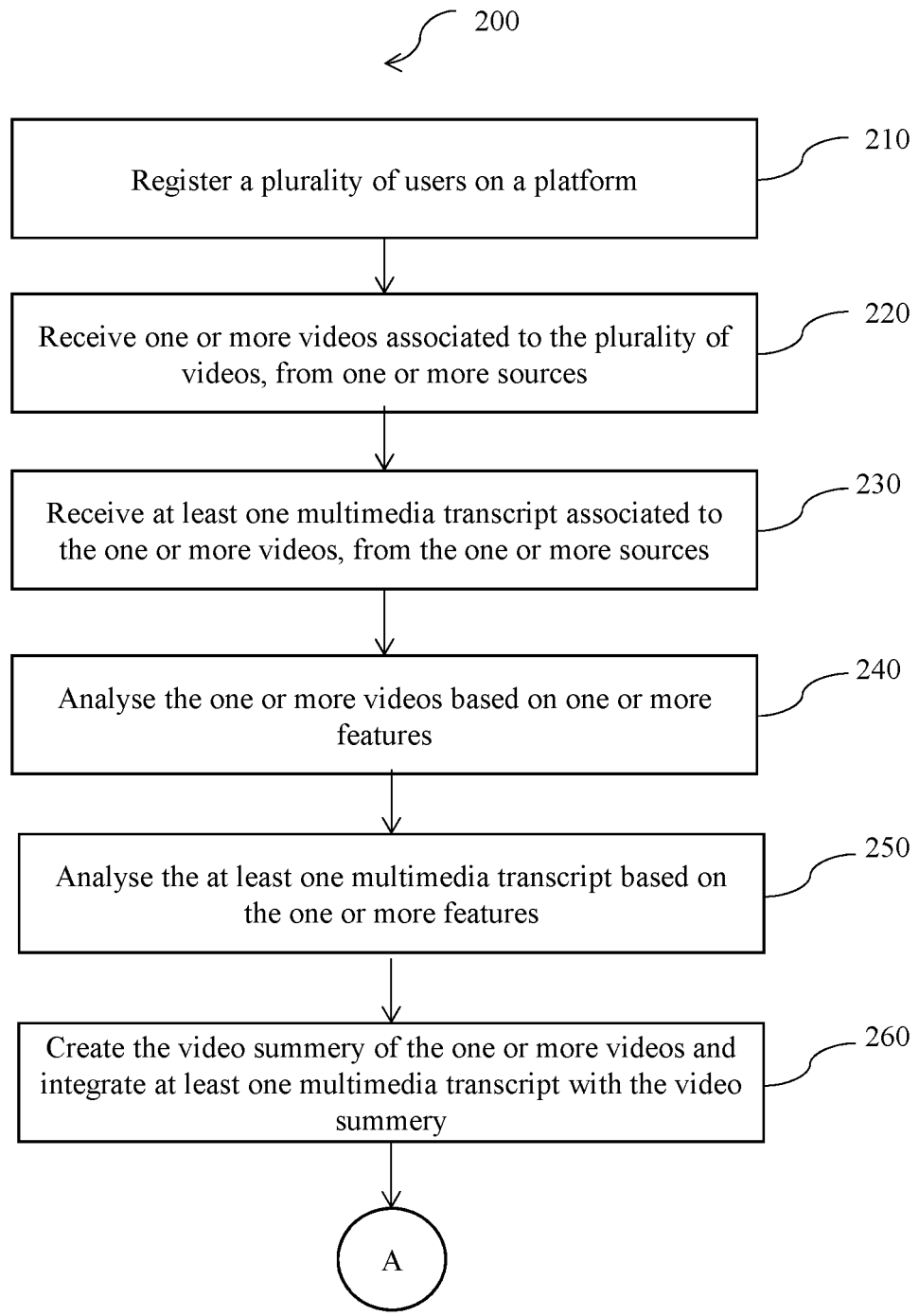
FIG. 4a and FIG. 4b are flow charts representing steps involved in a method for creating a video summary in accordance with an embodiment of the present disclosure.
Figure 4B:
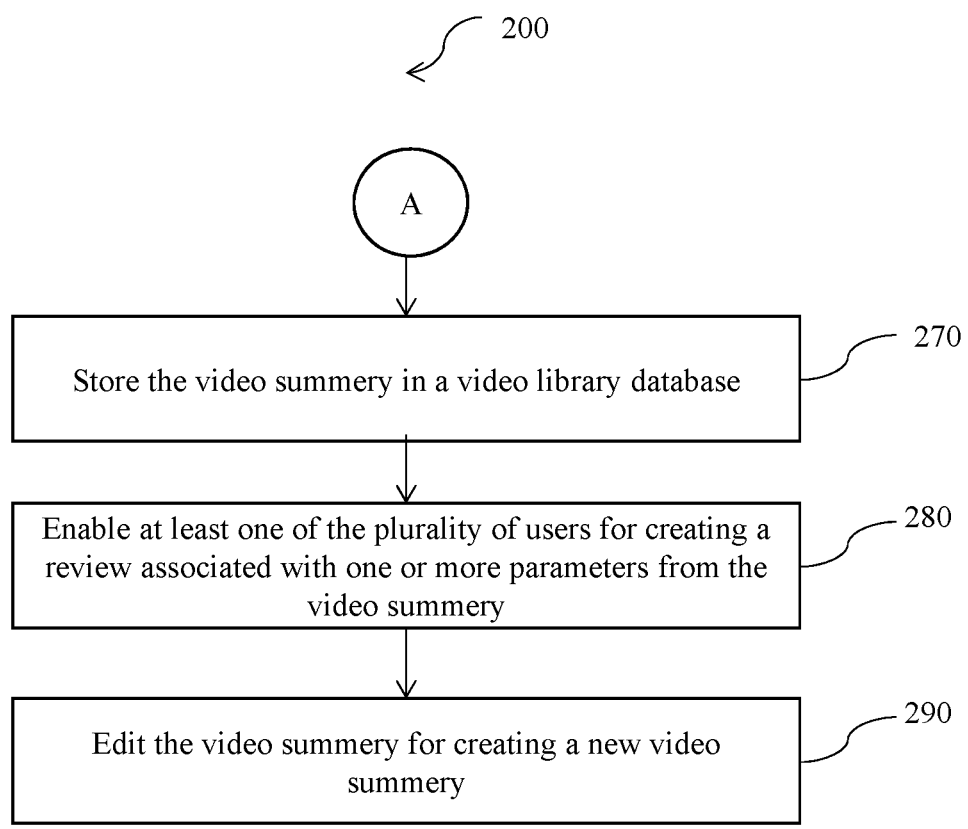

The memory 180 includes a plurality of modules stored in the form of executable program which instructs the processor 170 to perform the method steps illustrated in FIG. 4a and FIG. 4b. The memory 180 is substantially similar to the system 10 of FIG. 1. The memory 180 has the following modules: a registration module 30, a video input module 40, a video analysis module 50, a transcript input module 45, a transcript analysis module 55, a video summary module 60, a video storage module 70, a video review module 90, a video editing module 100.

The registration module 30 is configured to register a plurality of users on a platform. The video input module 40 is configured to receive one or more videos associated to the plurality of users. The transcript input module 45 is configured to receive at least one multimedia transcript associated to the one or more videos. The video analysis module 50 is configured to analyse the one or more videos based on one or more features to determine a relevancy between each of the one or more videos. The transcript analysis module 55 is configured to analyse the at least one multimedia transcript based on the one or more features to determine a relevancy between each of the at least one multimedia transcript. The video summary module 60 is configured to create the video summary upon integrating the one or more videos and the of the at least one multimedia transcript. The video storage module 70 is configured to store the video summary in a video library database. The video review module 90 is configured to enable at least one of the plurality of users to create a review associated with one or more parameters from the video summary. The video editing module 100 is configured to edit the video summary to create a new video summary and integrating at least one new multimedia transcript with the video summary.

FIG. 4a and FIG. 4b are flow charts representing steps involved in a method 200 for creating a video summary in accordance with an embodiment of the present disclosure. The method 200 includes registering a plurality of users on a platform in step 210. In one embodiment, registering the plurality of users includes registering the plurality of users by a registration module. In one embodiment, registering the plurality of users includes registering the plurality of users upon providing a plurality of user details such as name, age, occupation, employer, contact details/s or the like.

The method 200 also includes receiving one or more videos associated to the plurality of videos, from one or more sources in step 220. In one embodiment, receiving the one or more videos may include receiving the one or more videos by a video input module. In one exemplary embodiment, receiving the one or more videos may include receiving the one or more videos from at least one of an internal source, an external source or a combination thereof. In such embodiment, receiving the one or more videos from internal source may include receiving the one or more videos from a storage unit within the platform. In such another embodiment, receiving the one or more videos from external source may include receiving the one or more videos from a storage unit which may not be synced with the platform or with a user device.

The method 200 also includes receiving at least one multimedia transcript associated to the one or more videos, from one or more sources in step 230. In one embodiment, receiving the at least one multimedia transcript may include receiving the at least one multimedia transcript by a transcript input module. In one exemplary embodiment, receiving the at least one multimedia transcript may include receiving at least one of text transcripts, enriched metadata, voice/audio transcripts, or a combination thereof, wherein the at least one multimedia transcript is associated to the one or more videos. In one specific embodiment, the text transcripts may be a voice-based text transcripts.

Furthermore, the method 200 includes analysing the one or more videos based on one or more features for determining a relevancy between each of the one or more analysed videos using an image processing technique in step 240. In one embodiment, analysing the one or more videos may include analysing the one or more videos by a video analysis module. In one exemplary embodiment, analysing the one or more videos may include analysing the one or more videos based on at least one of time at which the one or more videos were captured, place in which the one or more videos were captured, event in which the one or more videos were captured, at least one of the plurality of users who have been captured in the one or more videos, content of the one or more videos or the like.

The method 200 also includes analysing the at least one multimedia transcript based on the one or more features to determine a relevancy between each of the at least one multimedia transcript using an image processing technique in step 250. In one embodiment, analysing the at least one multimedia transcript may include analysing at least one multimedia transcript by a transcript analysis module. In one exemplary embodiment, analysing the at least one multimedia transcript may include analysing at least one multimedia transcript based on at least one of time at which the one or more transcripts were created, event associated to the at least one multimedia transcript, at least one of the plurality of users associated to the corresponding at least one multimedia transcripts, content of the one or more transcripts or the like.

The method 200 also includes creating the video summary of the one or more videos in step 260. In one embodiment, creating the video summary may include creating the video summary by a video summary module. In one exemplary embodiment, creating the video summary may include creating the video summary using one of an artificial intelligence technique or a machine learning technique, or a combination thereof.

The method 200 also includes storing the video summary in a video library database in step 270. In one embodiment, storing the video summary may include storing the video summary by a video storage module.

Furthermore, the method 200 includes enabling at least one of the plurality of users for creating a review associated with one or more parameters from the video summary upon reviewing the created video summary from the video library database, upon enabling at least one of the plurality of users for tagging one or more of the plurality of users to the video summary in step 280. In one embodiment, enabling the at least one of the plurality of users for creating the review may include enabling the at least one of the plurality of users for creating the review by a video review module. In one exemplary module, enabling the at least one of the plurality of users for creating the review may include enabling the at least one of the plurality of users for creating the review based on at least one of coded comments, actionable assigned tasks, one or more moments, keywords, highlights, or a combination thereof. In such embodiment, the method 200 may further include representing the one or more parameters at least one new multimedia transcript, and transmitting the same to the platform. In one exemplary embodiment, representing the at least one new multimedia transcript may include representing at least one of text transcripts, enriched metadata, voice/audio transcripts, or a combination thereof.

The method 200 also includes editing the video summary for creating a new video summary and integrating at least one multimedia transcript with the new video summary, using a building block model based on one or more analysed videos using one of an artificial intelligence technique or a machine learning technique, or a combination thereof, based on the review created by the at least one of the plurality of users. In one embodiment, editing the video summary for creating the new video summary may include editing the video summary for creating a new video summary by a video editing module. In one embodiment, the method 200 may further include storing the new video summary in the video library database.

In one exemplary embodiment, the method 200 may further include interacting with the corresponding one or more users registered on the platform, wherein the interaction is associated to one of the coded comments, the actionable assigned tasks, or a combination thereof for creating the new video summary. In such embodiment, interacting with the one or more users may include interacting with the one or more users by an interaction module.

In another exemplary embodiment, the method 200 may further include generating a notification representative of the review created by the at least one of the plurality of users based on one or more policies. In such embodiment, generating the notification may include generating the notification by a notification module. In one embodiment, generating the notification may include generating the notification based on at least one collaboration of the plurality of the user, wherein the one or more policies are categorized by the one or more authorized users.

In yet another embodiment, the method 200 may further include sharing the video summary among the plurality of users upon receiving an instruction from at least one of the plurality of authorized users. In such embodiment, sharing the video summary may include sharing the video summary by a video sharing module. In one embodiment, the method 200 may further include enabling the multiple users and the reviewers to interact on the platform by providing one or more comments or one or more tasks to facilitate the discussion associated to the video summary. The method 200 may further include persisting or closing the comments or tasks, by the authorized users for signifying the completion of workflow of the video summary which is a collaboration of the one or more videos and the at least one multimedia transcripts.

Various embodiments of the present disclosure enable the system to provide a platform to create the video summary by integrating audio-based transcripts with the multiple video frames. Also, the system enables the user to review and modify the video summary as per their needs, requirements or the like by providing the comments or tasks in a form of time coded comments or an actionable assigned task. Further, the platform helps multiple users to interact and conclude or decide on the required modifications for the video summary, which makes the system reliable and more efficient.

Also, since the system uses the machine learning technique and the artificial intelligence technique, the system is more reliable as it learns from every built video summary, thereby making the system understand and provide most accurate video summary for the users. In addition, the platform is highly secure, and do not allow any sharing of the video summary without the consent of the user or any authorized entity, thereby making the system more reliable. Further, since the system can integrate the video frames with the audio-based text transcripts, it provides a unique approach and also a new and enhanced user experience.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A system for creating a video summary, the system comprising:
   one or more processors;
   a registration module, operable by the one or more processors, configured to register a plurality of users on a platform;
   a video input module, operable by the one or more processors, configured to receive one or more videos associated with the plurality of users;
   a transcript input module, operable by the one or more processors, configured to receive at least one multimedia transcript associated with the one or more videos;
   a video analysis module, operable by the one or more processors, configured to analyze the one or more videos based on one or more features to determine a relevancy between each of the one or more videos, the analysis based at least in part on an image processing technique;
   a transcript analysis module, operable by the one or more processors, configured to analyze the at least one multimedia transcript based on the one or more features to determine a relevancy between the at least one multimedia transcript and the one or more videos, the analysis based at least in part on a natural language processing technique;
   a video summary module, operable by the one or more processors, configured to create the video summary upon integrating the one or more videos and the at least one multimedia transcript based on the analysis performed by the video analysis module and the transcript analysis module;
   a video storage module, operable by the one or more processors, configured to store the video summary in a video library database;
   a video review module, operable by the one or more processors, configured to enable at least one of the plurality of users to create a review associated with one or more parameters from the video summary;
   a video editing module, operable by the one or more processors, configured to enable at least one of the plurality of users to edit the video summary to create a new video summary integrating at least one new multimedia transcript using a building block model based on one or more analyzed videos; and
   a notification module, operable by the one or more processors, configured to generate a notification representative of the review created by at least one of the plurality of users based on one or more policies.

2. The system of claim 1, wherein the one or more features comprises a time at which the one or more videos were captured, a place in which the one or more videos were captured, an event in which the one or more videos were captured, at least one of the plurality of users captured in the one or more videos, or a combination thereof.

3. The system of claim 1, wherein the at least one multimedia transcript comprises text transcripts, enriched metadata, voice transcripts, or a combination thereof.

4. The system of claim 1, wherein the one or more parameters comprises coded comments, actionable assigned tasks, moments, keywords, highlights, or a combination thereof.

5. The system of claim 4, further comprising a video interaction module, operable by the one or more processors, configured to interact with one or more of the plurality of users registered on the platform, wherein the interaction is associated with one of the coded comments, the actionable assigned tasks, or a combination thereof to create the new video summary.

6. The system of claim 1, wherein the one or more policies is comprised of a collaboration by the plurality of users, and wherein the one or more policies are categorized by an authorized user.

7. A method of creating a video summary, the method comprising:
   registering, by a registration module, a plurality of users on a platform;
   receiving, by a video input module, one or more videos associated with the plurality of users;
   receiving, by a transcript input module, at least one multimedia transcript associated with the one or more videos;
   analyzing, by a video analysis module, the one or more videos based on one or more features to determine a relevancy between each of the one or more videos, the analysis based at least in part on an image processing technique;
   analyzing, by a transcript analysis module, the at least one multimedia transcript based on the one or more features to determine a relevancy between the at least one multimedia transcript and the one or more videos, the analysis based at least in part on a language processing technique;
   creating, by a video summary module, the video summary upon integrating the one or more videos and the at least one multimedia transcript based on the analysis performed by the video analysis module and the transcript analysis module;
   storing, by a video storage module, the video summary in a video library database;
   enabling, by a video review module, at least one of the plurality of users to create a review associated with one or more parameters from the video summary;
   enabling, by a video editing module, at least one of the plurality of users to edit the video summary to create a new video summary integrating at least one new multimedia transcript using a building block model based on one or more analyzed videos; and
   generating, by a notification module, a notification representative of the review created by at least one of the plurality of users based on one or more policies.

8. The method of claim 7, wherein the one or more features comprises a time at which the one or more videos were captured, a place in which the one or more videos were captured, an event in which the one or more videos were captured, at least one of the plurality of users captured in the one or more videos, or a combination thereof.

9. The method of claim 7, wherein the at least one multimedia transcript comprises text transcripts, enriched metadata, voice transcripts, or a combination thereof.

10. The method of claim 7, wherein the one or more parameters comprises coded comments, actionable assigned tasks, moments, keywords, highlights or a combination thereof.

11. The method of claim 10, further comprising interacting, by a video interaction module, with the plurality of users registered on the platform, wherein the interaction is associated with one of the coded comments, the actionable assigned tasks, or a combination thereof to create the new video summary.

12. The method of claim 7, wherein the one or more policies is comprised of at least one collaboration by the plurality of users, and wherein the one or more policies are categorized by an authorized user.

\* \* \* \* \*